Oct. 11, 1955

J. A. CHATER 2,720,337

DEVICE FOR CONTROLLED DISCHARGE OF ARTICLES
FROM A STORAGE CONTAINER OR THE LIKE

Filed June 12, 1951

INVENTOR
JOHN A. CHATER
BY
ATTORNEY

Oct. 11, 1955     J. A. CHATER     2,720,337
DEVICE FOR CONTROLLED DISCHARGE OF ARTICLES
FROM A STORAGE CONTAINER OR THE LIKE
Filed June 12, 1951     8 Sheets-Sheet 2

INVENTOR
JOHN A. CHATER

BY

ATTORNEY

Oct. 11, 1955          J. A. CHATER          2,720,337
DEVICE FOR CONTROLLED DISCHARGE OF ARTICLES
FROM A STORAGE CONTAINER OR THE LIKE
Filed June 12, 1951          8 Sheets-Sheet 3

INVENTOR.
John A. Chater,
BY

Oct. 11, 1955                J. A. CHATER                2,720,337
          DEVICE FOR CONTROLLED DISCHARGE OF ARTICLES
             FROM A STORAGE CONTAINER OR THE LIKE
Filed June 12, 1951                              8 Sheets-Sheet 5

INVENTOR.
John A. Chater,
BY

United States Patent Office 2,720,337
Patented Oct. 11, 1955

2,720,337

DEVICE FOR THE CONTROLLED DISCHARGE OF ARTICLES FROM A STORAGE CONTAINER OR THE LIKE

John A. Chater, Topsham, Maine

Application June 12, 1951, Serial No. 231,174

24 Claims. (Cl. 221—111)

This invention relates to a device for feeding objects mechanically one at a time, from a storage space as may be required in a vending machine or for other purposes. It especially relates to vending bottles or packages of substantially uniform size. Although primarily designed for vending, the mechanism may also be used wherever it is desired to feed suitable articles from a storage space, one at a time, and to control the feeding. This may be desirable for certain operations in a factory, or a material handling system.

In general, an object of the invention is to provide a simple mechanism for feeding articles of uniform size from a rectangular surface one, or a predetermined number, at a time, and to control the time at which such discharges occur. It contemplates placing the articles on the surface in parallel rows divided by guides and pushing the articles of one row off the surface one at a time and then, without interruption, proceeding to do likewise with the articles of each succeeding row in turn until all the articles have been discharged from the surface.

More specifically it contemplates separate mechanisms for advancing the articles of each row and a single actuator for operating all the advancing mechanisms and latches associated with each row to prevent the actuator from operating the advancing mechanism of each row, the latches being in position to prevent operation of their advancing mechanisms as long as any articles remain in the row which is to be or is being previously discharged but more to release the advancing mechanism when all the articles of the preceding row have been discharged, there being no latch for preventing discharge from the first row.

Another object of the invention is to make possible a design in which the feeding mechanism is built integral with the article supporting surfaces to produce a tray which can be readily inserted and removed as a unit into or from the cabinet of the vending machine. This cabinet may be refrigerated.

A further object is to make possible a tray of relatively little depth from the surface that supports the articles to the underside of the mechanism so as to insure little waste of space in the cabinet. This is especially desirable where refrigeration is used.

Another object is to provide a mechanism that can be readily assembled or disassembled without screws or bolts or tools, for rapid initial assembly at low cost and for easy cleaning and servicing.

Another object is to provide a vending unit that can be readily adapted to manual or power operation. This results from the fact that only a short reciprocating motion is required to deliver each article.

Another object is to make possible a unit made almost entirely from punched and formed sheet metal parts that are assembled into the basic parts by spot welding, thus creating a low cost unit.

These and other objects and advantages of the invention will be more fully apparent from the following description of my preferred embodiment made in connection with the accompanying drawings. While the drawings show the preferred embodiment it must be understood that many variations can be made in the shape and proportions of the parts and their relative positions and arrangement without departing from the principal of the invention.

The drawings show a preferred embodiment of the invention for use in a cabinet. This cabinet is shown as an insulated refrigerated cabinet with a door at the front. The mechanism can, however, be used outside a cabinet for certain uses as, for instance, feeding objects through a wall as might be done in an "automat restaurant" or for certain manufacturing uses. The drawings also show a manually operated unit although operation can be by any form of power applied to reciprocate the drive bar that operates the mechanism.

Referring to the drawings.

In general the method of feeding the bottles or other articles, is to stand them on a rectangular tray in rows separated by guides, and to push each bottle, of one row, in succession off the end of the row and then in like manner to push the bottles of each succeeding row off the end of their rows. Means are provided for automatically starting the feeding of bottles from a succeeding row when all the bottles of the preceding row have been discharged. The interval between the discharge of successive bottles is ordinarily controlled by the operator, that is the customer in the case of a vending machine.

Figures 1, 33:
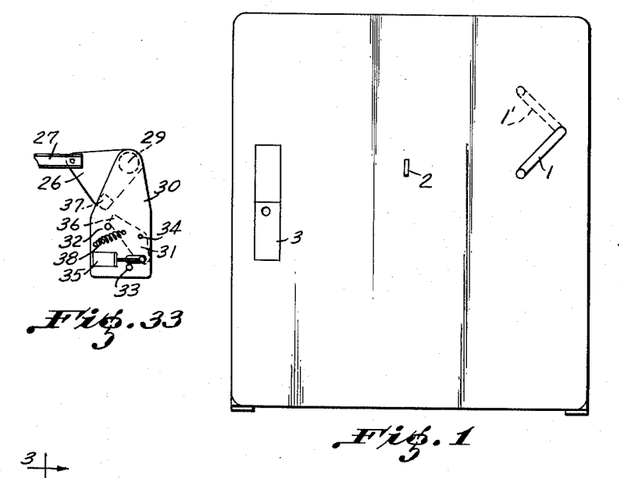
Figure 1 shows a front view of the cabinet in which the vending mechanism is mounted.
Figure 33 is a side view of operating control mechanism in normal position.

Referring to Figure 1, lever 1 on the front of the door is for vending a bottle, or other object, after this has been made possible by inserting a coin into a suitable electrical coin mechanism, not shown, through the slot 2. After inserting a coin the lever 1 is moved up to the dotted position 1' and back to the position 1. Then the sliding door 3 may be raised and the vended bottle removed.

Figure 2:
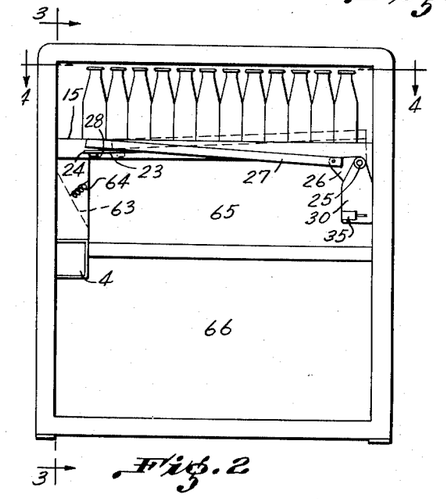
Figure 2 is a front view of the cabinet with the door removed showing the vending unit in place.
Figure 3:
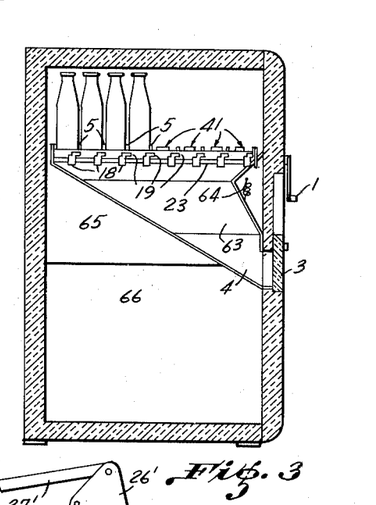
Figure 3 is a section through the cabinet on line 3—3 of Figure 2 showing an end view of the unit and discharge chute.

In Figure 2 the vending unit is shown in place in the cabinet with a load of bottles or the partial load shown in the other views. Figure 3 shows the vending unit from the discharge end with the unvended bottles in place and the discharge chute 4.

The vending unit is made in the form of a tray on which the bottles stand in rows separated by low guides 5. The tray is shown best in Figs. 4, 5, 10 and 38. The tray is made up of a number of substantially coextensive slats 6 supported upon spaced bolsters 12 extending transversely of said slats and connected at their outer ends by side-boards 15 projecting above the supporting surface of the tray. These slats extend the entire length of the unit and are formed, preferably, of sheet metal bent into elongated members, which are right-angular in cross-section with a wide horizontal leg and a short vertical leg. These slats are made in right hand and in left hand members and arranged in pairs, each pair comprising a right and left hand member, with their short vertical legs projecting upwardly and disposed in contiguous face-to-face relation and spot-welded together, as shown particularly in Figures 6, 7, 8, 38 and 40, to provide the low fences 5, referred to above. At each side of the tray, a single slat 6' is employed having their vertical upstanding legs in juxtaposition with the sideboards 15 of the tray to which they are attached by spot-welding. The pairs of slats and single slats are placed parallel to each other with all their wide horizontal legs in one plane to form the surface of the tray. Each pair of slats 6 and the slats 6' are separated from their adjacent pairs or their adjacent single slat, by a small space between their adjacent edges thus forming slots 7 that extend the entire length of the tray unit, the slots being relatively narrow.

Figures 8, 9:
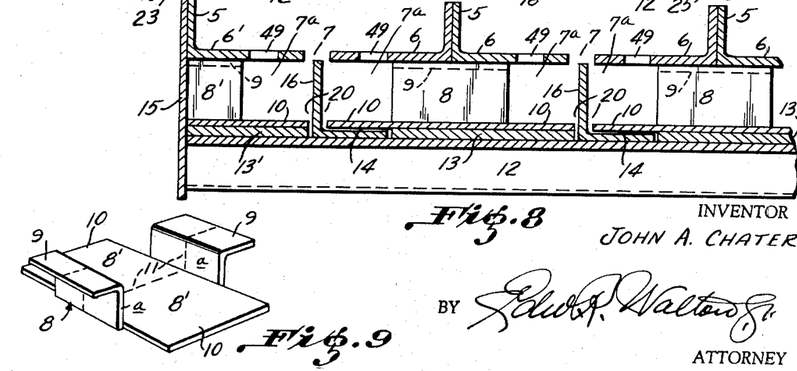
Figure 8 is a partial section through a transverse frame member of the vending unit on line 8—8 of Figure 10.
Figure 9 is a perspective view of one of the spacing members of the vending unit.

The slats 6 and 6' are held in spaced relation above the bolsters 12 by spacer members 8 and 8', one spacer 8 being disposed underneath each pair of joined slats 6 and the spacers 8' being disposed under slats 6' as shown in Fig. 8. The construction of the spacers 8 is more clearly shown in Fig. 9 as being substantially of channel-form with the open side up and with the upper portion of the side walls $a$ of the channels bent laterally to provide outwardly extending horizontal flanges 9; and said side walls $a$ and their flanges 9 are cut away at both ends leaving flat projecting extensions 10 at the bottom of the channel which provide a broad bottom supporting surface for the spacers and which cut-away portions provide a clear working space between an overlying portion of the slats for the pushers and progressor bars to be described hereinafter. As can be seen from Fig. 8, the spacers 8' are half the length of the spacers 8, as though made by cutting a spacer 8 in two on the dotted line 11 (Fig. 9), and that the length of the flanges 9 are considerably less than the width of the slats. As shown in Fig. 8, the spacers are arranged under their respective slat members with their flanges 9 contacting the under-surfaces thereof and extending transversely of said slat members, but the cut-away or end edges of the side walls $a$ and of the flange 9 are spaced inwardly for a distance from the spaced longitudinal edges of their slat members, which form the slots 7, so as to provide the clear space 7a between the marginal slot-forming edge of the slats and the bottom end extensions 10 of the spacers. The ends of the extensions 10 of adjacent spacers are spaced from each other and underlie the slots 7 so as to permit the progressor bars 16 to extend therebetween. The horizontal flanges 9 of the spacers 8 and 8' are spot welded to the under sides of their slats 6 and 6' and are attached at points relatively near, but not at, each end of the slats.

Figure 5:
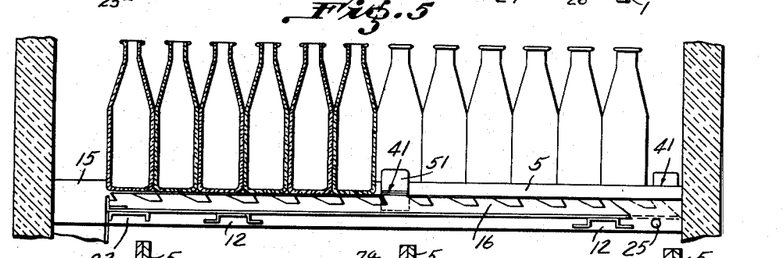
Figure 5 is a section through the vending unit taken on line 5—5 of Figure 4.
Figure 6:
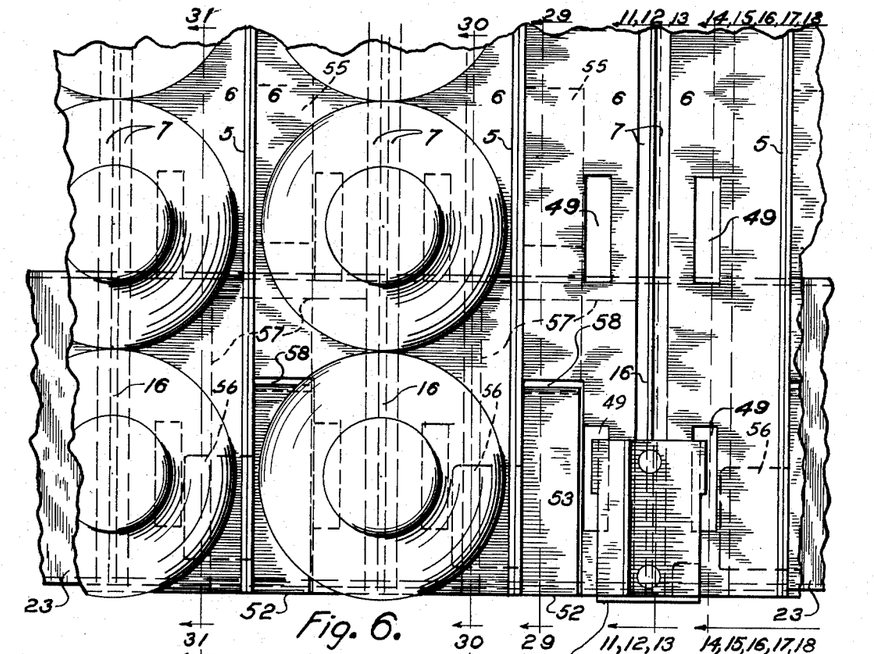
Figure 6 is an enlarged partial top view of the discharge end of the vending unit.
Figure 10:
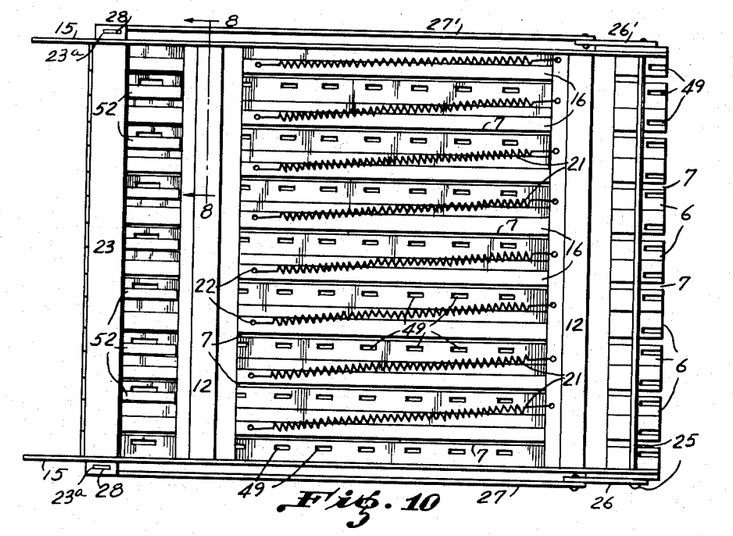
Figure 10 is a bottom view of the vending unit.
Figure 11:
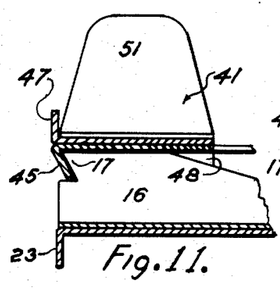
Figures 11, 12 and 13 are enlarged sections through a pusher on line 11—11, 12—12 and 13—13 of Figures 6 and 7 showing pusher in different positions of travel.

In order to unite all the slats into a tray, the spacers 8 and 8' are placed on transverse members 12 shown in Figures 5, 8 and 10 and are spot-welded to them with shims 13 and 13', Figure 8, between. The shims 13 are shorter than the length of the spacers 8 and are set to one side so as to cause one end of spacers to project leaving a space 14 between the projected end of each spacer 8 and the transverse members 12.

The above assembly forms a tray with low guides 5 extending its entire length, and with slots 7 through the tray also extending its entire length and located centrally between the guides 5. In addition a clear space is provided below each slot 7. This space is much wider than the slot and extends over the connecting transverse frame members 12. The purpose in providing these clear spaces is to provide working space for the mechanisms that advance the bottles of each row as described hereinafter. One part of the individual mechanism which is provided for each lane to advance the bottles in its lane independently of the other lanes, is the progressor bar 16.

Figures 21, 22, 23, 24, 25, 27, 28:
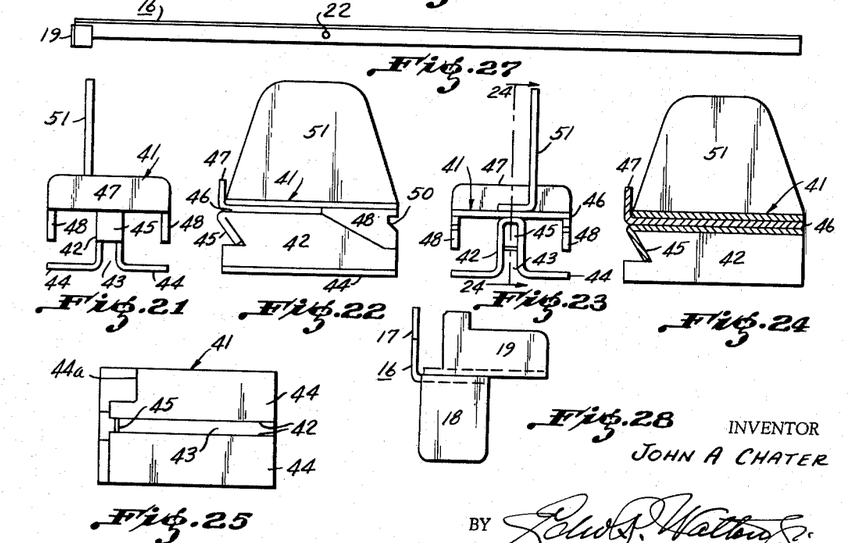
Figures 21, 22 and 23 are respectively a front, a side and a rear view of one pusher.
Figure 24 is a vertical longitudinal section through the center line of one pusher on line 24—24 of Figure 23.
Figure 25 is a bottom view of one pusher.
Figures 26, 27 and 28 are respectively side, top and front end views of one progressor bar.
Figure 26:
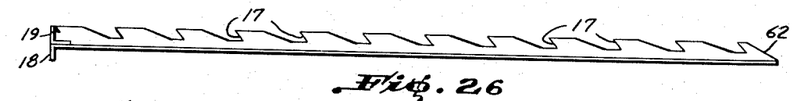

The progressor bars 16 are shown in detail in Figures 26, 27 and 28. These bars are made by bending sheet metal into angle bars. The vertical leg of the angle has teeth 17 cut in its top edge. They also have the horizontal legs bent downward vertically to form lugs 18. These lugs 18 are used to engage against the edge of a bar that operates the progressor bars as described later. The progressor bars are further provided with vertically upwardly extending lugs 19. This lug 19 is bent in the form of an angle and is attached to the forward end of the progressor bar by its horizontal leg.

An entire progressor bar 16 is mounted for endwise reciprocation under each slot 7 of the tray, the upper edge of the bars with the teeth being directly below the center of the slot 7 and just below the slats 6. The projecting ends 10 (Figure 8) of the spacers 8 are of such length that the end of one spacer 8 does not quite meet the end of the next adjacent spacer 8 thus leaving a narrow gap 20 (Figure 8) between their ends. The shims 13, Figure 8, also provide the clear space 14 under one end of each spacer and between it and the cross members 12 (Figures 5, 8 and 10). The progressor bars 16 are inserted endwise into spaces 14 and gaps 20 from the discharge end of the tray. They are guided, therefore, at two points, that is just above the transverse members 12. The bars rest on and slide crosswise over the transverse members 12 and are guided by the ends of the spacers 8. The projecting ends 10 of the spacers 8 prevent the progressor bars 16 from rising up or turning over by confining them from above. The progressor bars 16 may be seen in the bottom view of the unit Figure 10. In order to hold the progressor bars in place, tension springs 21 are hooked, at one end, into holes 22 in the progressor bars and at the other end into holes in one transverse member 12, as shown in Figure 10. These springs pull the progressor bars 16 in a direction away from the discharge end of the unit causing their downwardly extending lugs 18, unless prevented from doing so by means hereinafter described, to at all times bear against a bar 23. This bar 23 extends across the unit and is the drive bar that operates the unit. The lugs 18 bearing against the bar 23 are shown in Figures 7, 14, 29, 30, 38 and 39.

The drive bar 23 is slidably mounted at each end since it projects through longitudinal slots 24 in the side frame members 15, near the discharge end of the unit. The bar 23 is, therefore, free to reciprocate sidewise in these slots. The slots 24 are of such height that the top surface of the drive bar 23 is just below the progressor bars 16, which insures that the lugs 18 will bear against the forward edge of the drive bar 23.

In order to reciprocate the drive bar 23 and keep it at right angles to the sides of the unit, as is preferable, a shaft 25 (Figures 38, 10, 24 and 25) is pivoted in holes in the side members 15 at points below the unit and near the end remote from the discharge end. Plates 26 and 26' are rigidly attached to the ends of the shaft 25 as shown in Figs. 2, 5, 35, 36, 37, 38 and 10. Links 27 and 27' are pivotally connected at one end, one on each side of the unit, to these plates at equal distances from the center of the shaft 25 thus producing crank throws which must lie in the same plane. The other ends of the links 27 and 27' are equipped with flat downwardly pointing lugs 28 shown in Figs. 2, 4, 10 and 38. These lugs 28 extend downward through slots 23a in each end of the drive bar 23. The slots 23a are large enough to accommodate the lugs 28 and are also large enough to allow the lugs to pivot through an angle proportional to the change of position taken by the end of the links 27 and 27' which are pivotally connected to the plates 26 and 26', thus forming a pivot connection between the links 27 and 27' and the drive bar 23 and also prevent endwise movement of the drive bar. By this arrangement, the drive bar can be made to reciprocate in the slots 24 and always remain at right angles to the sides of the unit by turning the shaft 25 through an angle of about 90 degrees.

Figure 34:
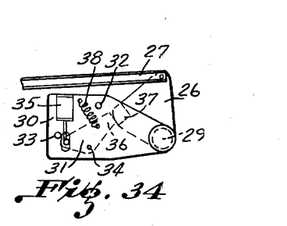
Figure 34 is a side view of operating control mechanism when at the end of the back stroke.
Figure 35:
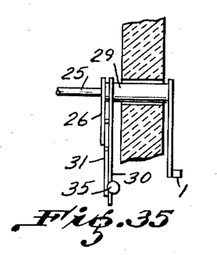
Figure 35 is an end view of operating control mechanism showing the door of the cabinet in section.
Figure 36:
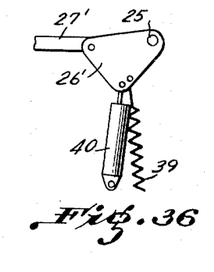
Figure 36 is a side view of the unit operating spring and dash pot in normal position.
Figure 37:
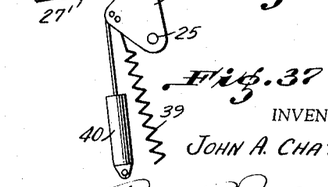
Figure 37 is a side view of the unit operating spring and dash pot in their position at the end of the back stroke.

Any means may be used to turn the shaft 25 through the angle of about 90 degrees. The method shown is for manual operation. The lever 1 (Figure 1) could be directly attached to the shaft 25. However, it is desirable to reduce the possibility of damage and poor operation that might result if an operator should jerk the lever back and forth. In a vending machine it is also necessary to allow operation only after a coin has been inserted in the coin mechanism. To accomplish this, the device shown in Figs. 33, 34 and 35 is used. This device also allows the cabinet door to be opened without making any disconnection of lever 1 from the shaft 25.

Figure 4:
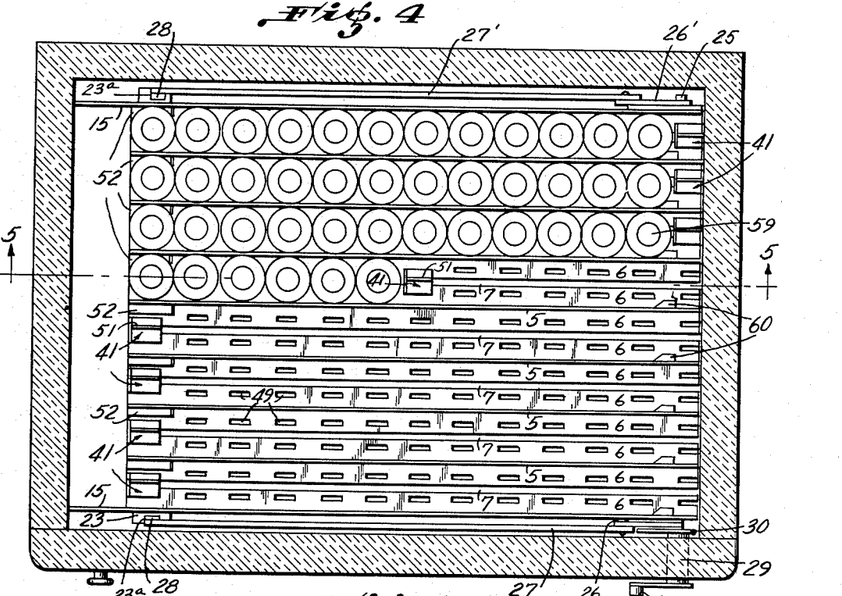
Figure 4 is a section through the cabinet on line 4—4 of Figure 2 showing top view of vending unit in cabinet.

A short shaft 29 (Figs. 33, 34 and 35) is journalled through the wall of the door of the cabinet as shown in Figure 4. Lever 1 is rigidly fastened to the outer end and the plate 30 is rigidly fastened to the inside end. The triangular shaped dog 31 is pivotally mounted at one corner, to the inside of the plate 30. Stops 32 and 33 limit the rotation of the triangular dog 31 about its pivot 34. A small solenoid 35 is also attached to plate 30 and its plunger is linked to a free corner of dog 31. Energizing the solenoid 35 will therefore swing the dog against the stop 33. This places the driving corner 36 of dog 31 in position to engage re-enforced corner 37 of the plate 26.

The plate 26, as mentioned above, is rigidly attached to the end of shaft 25 and the arm 27 is pivoted on it, there being a similar plate 26' at the other end of the shaft with a similar arm 27' pivoted to it. The plate 26 at the forward side of the unit is shaped approximately as a sector of a circle, the center of which is the shaft 25. The arm 27 is pivoted to the upper corner. The lower corner is formed with the lower edge approximately radial thus presenting a surface for the dog 31 to engage. When the door of the cabinet is closed the center line of shaft 29 is approximately an extension of the center line of shaft 25.

When the solenoid is de-energized the small spring 38 will swing the dog 31 against the stop 32 and the lever 1 and plate 30 may be swung up and down without operating the mechanism. With the solenoid energized raising lever 1 causes the dog to engage the corner 37 of the plate 26 and swing it upward. This rotates shaft 25 about 90 degrees and swings the ends of arms 27 and 27' up and away from the discharge end of the unit, as shown in dashed lines, Figure 2. The drive bar 23, in which the arms 27 are pivoted by the lugs 28, is thus drawn back to the rearward end of its stroke.

A tension spring 39 (Figs. 36 and 37) is attached to the rear plate 26' and to the cabinet. When the lever 1 is raised this spring is stretched as in Fig. 37. When lever 1 is released or moved to its lower position, the spring 39 rotates the shaft 25 and swings the plates 26 and 26' downward thus forcing bars 27 and 27' and drive bar 23 forward. The speed of this motion is controlled by the dash pot 40 shown in Figs. 36 and 37.

Figures 38, 39:
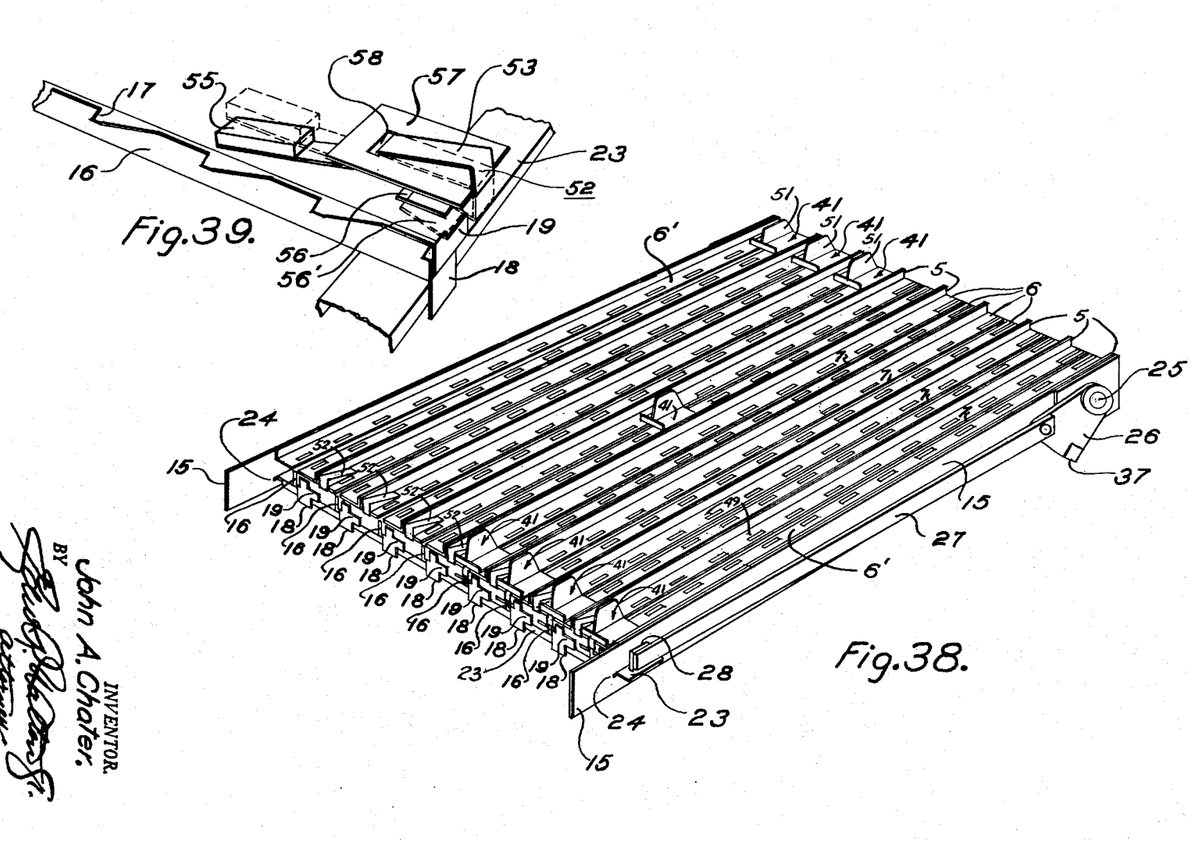
Figure 38 is a perspective view of the vending unit only showing the pushers in the same positions as in Figures 4 and 5 and all latches in raised position.
Figure 39 is a perspective view showing one latch mounted in its supporting plate separated from the rest of the tray, and relative positions of latch and progressor bar.

In order to move the rows of bottles, pushers 41 are used. These are detailed in Figs. 21, 22, 23, 24 and 25. Three pushers 41 are shown at their starting positions in Fig. 4, standing behind completely filled rows of bottles. They are also shown in elevation in Fig. 5. Figs. 4, 5 and 38 also shown one pusher 41 at an intermediate point of its travel along its lane corresponding to its position when it has discharged one-half the bottles from its lane. These figures also show four pushers 41 at the discharge end of their lanes this being the position they occupy after having discharged all the bottles from their lanes.

The pushers 41 (Figures 21, 22, 23, 24 and 25) are preferably made of three parts welded together. The lower part 42 is a piece of sheet metal bent to form a channel with a narrow vertical groove 43 in the lower side. The lower ends of the channel legs are bent horizontally outward as at 44. A forward corner of one of the outward bent flanges 44 is notched back as shown at 44a (Fig. 25). The piece is cut before bending so that the lug 45 can be bent downward and inward as shown. The lug is for engagement with the teeth of the progressor bar which operates it. A second piece 46 is attached centrally above the piece 42. This piece is in the form of a flat plate with the forward end bent vertically upward to form the bottle pushing flange 47. The sides of the plate 46 are suitably cut and bent vertically downward to form the triangular lugs 48 on each side of the plate 46 at the rear end. These lugs are for engagement in perforations 49 in the slats on which the bottles stand to prevent rearward motion. Small notches 50 (Fig. 22) are cut in the top rear edges of these lugs to prevent the pusher 41 from raising up and disengaging from the perforations during the rearward stroke of the progressor bar 16. The forward edges of the lugs 48 are sloped upwardly toward the front. These edges are required to raise the rear of the pusher 41 during forward motion and so disengage it from the perforations in the tray slats. The third piece that completes the pusher 41 is simply a handle for grasping by the attendant when resetting the pushers to their starting positions while refilling the unit with bottles or other articles to be vended. This handle is simply a flat plate 51 projecting upward and attached to the pusher 41 by a small flange.

Figure 7:
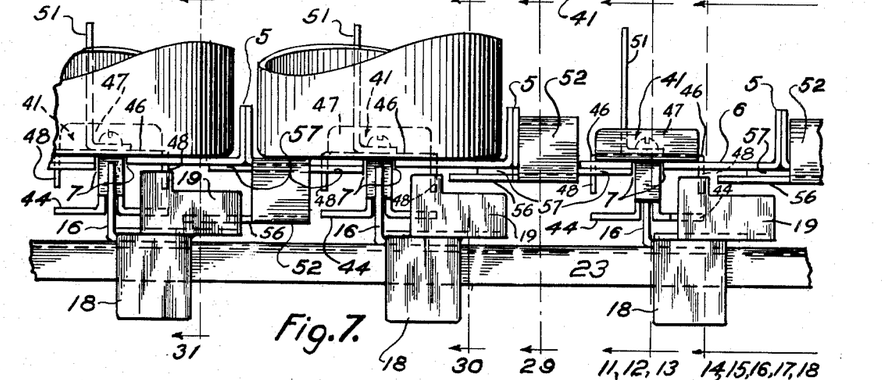
Figure 7 is an end view of Figure 6.

The pushers 41 are inserted into the slots 7 of the tray from the discharge end. They are placed in the slots 7 as shown in Fig. 7 with the plate portion 46 above the slats 6 and the flanges 44 below the slats. The ends of the tray slats 6 are bent downward at the end remote from the discharge to prevent the pushers 41 from coming out of their slots 7 at that end. When the progressor bars 16 are inserted as described above, their teeth will pass through the groove 43 in the pushers 41, unless the pushers are in their starting position, in which case the progressor bars 16 are not long enough to reach them until the drive bar 23 makes its rearward stroke. The pushers 41 are prevented from coming out of their slots 7 at the discharge end by the lugs 19 projecting upward from the end of their progressor bar 16.

The backward and forward motion of the progressor bars 16 move the pushers 41 along the lanes and thereby push the rows of bottles forward. Details of this action are described later.

The drive bar 23 operates the progressor bars 16 and therefore the pushers 41 of all the rows. The tension of the springs 21 tend to pull the progressor bars 16 away from the discharge end of the unit. If a progressor bar 16 is not held at the forward end of its stroke, by means shortly to be described, the tension of its spring 21 will force the lug 18 of the progressor bar 16 against the forward edge of the drive bar 23. Thus when the drive bar 23 is moved on a rearward stroke, the progressor bar 16, due to the pull of its spring 21, will move rearward with the drive bar 23, since the lug 18 will continue to bear against the forward edge of the drive bar 23 and follow it. Therefore any progressor bar, 16, not restrained by other means, will follow the drive bar 23 on every rearward stroke of the drive bar. The next forward stroke of the drive bar 23 will force the progressor bar forward again by pressure against the lug 18 and the stretching of the spring 21. The drive bar 23 will therefore cause the progressor bar 16 to operate with it over the same stroke.

A latch 52 is provided at the discharge end of each lane, except the last lane, to prevent bottles or other articles from being discharged from all of the lanes at the same time, when the device is actuated, as shown more particularly in Figures 4, 6, 7, 29, 30, 31, 32, 38 and 39. Generally stated, these latches prevent the operation of the progressor bars in the lanes having a bottle therein and which lane or lanes is controlled by a latch, each latch in turn being controlled by the bottles (or other articles) in a preceding lane of said series of lanes. One of these latches 52 is shown in perspective in Fig. 20. They are preferably made by stamping out a piece of sheet metal, preferably spring steel, in the form of a narrow flat bar or ribbon. One end is then bent upward and back on itself to form a flat closed loop. The top 53 of this loop is a straight line and presents a flat surface. Its inner end 54 is bent downward to meet the piece near its center. A weight 55 is fastened to the other end. A lug 56 projects from one side of the lower portion of the loop.

Figure 20:
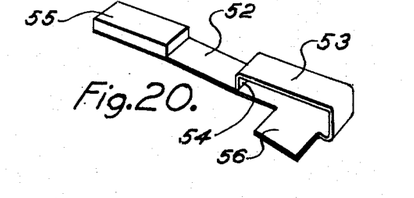
Figure 20 is a perspective view of one latch.

To mount the latches 52 in the tray, the discharge end of one slat 6 in each lane is notched out the same shape as the flat upper portion 53 of the latch 52 and slightly larger for clearance. A plate 57 (Figs. 7, 32 and 39) is then spot welded to the underside of the slat 6 below the notch. Plates 57 are shown by broken lines in their positions below slats 6 in Fig. 6. The plates 57 have small rectangular holes 58 (Figs. 6, 32 and 39) punched through them at the inside ends of the notches in the slats. The holes 58 are somewhat larger than the downwardly pointing ends 54 of the latches. These downward pointing ends are numbered 54 (Fig. 20). To assemble the latches in the tray, the short ends 54 are sprung away from the under portion of the latches and are then slipped over the plates 57 and slid along the notches in the slats 6, from the discharge end of the tray, until the short ends 54 snap down into the holes 58. The latches are therefore free to swing about a point next to the short ends 54 being supported at this point by the edge of holes 58 as a fulcrum. A latch is assembled in this manner in slots at the end of each lane except the last lane to be discharged. Weights 55 serve to normally keep the weighted ends down and to elevate the loop end of the latches and the sidewise projecting lugs 56. Lug 56 is shown in Figs. 7, 20, 32 and 39. Any force applied to the flat top portion 53 (Fig. 20), such as the weight of a bottle resting on it, will cause the latch to swing down at the loop end until the flat portion 53 rests on the plate 57. Since the material from which the slats 6 and the latches 52 are made is of the same thickness, the top of the flat portions 53 will be flush with the top of the slats when the latch is depressed. Therefore, a bottle can be placed upon it and will stand as on any flat surface and will hold the forward end of the latch 52 down.

Figure 29:
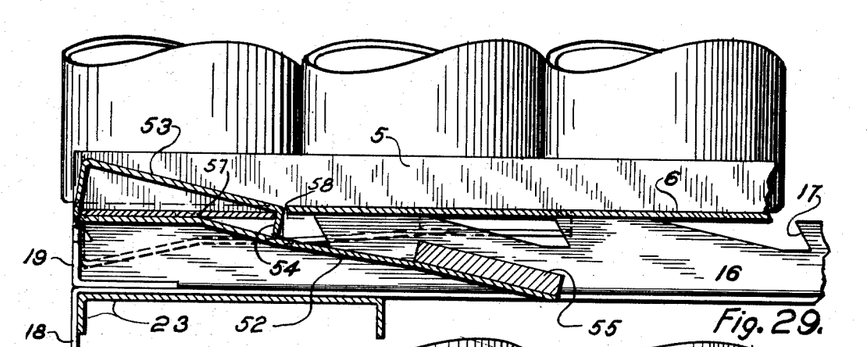
Figure 29 is a vertical section through a latch taken on the line 29—29 of Figures 6 and 7.
Figure 30:
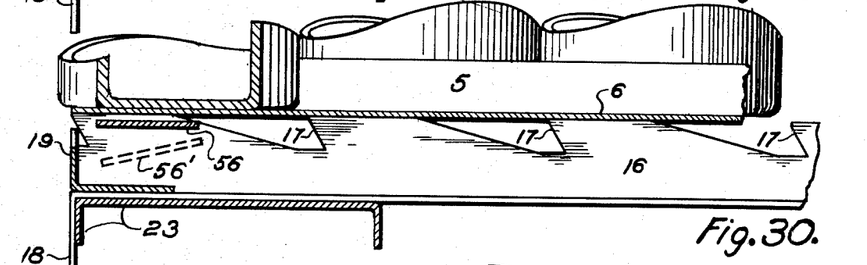
Figure 30 is a vertical section through a latch lug taken on the line 30—30 of Figures 6 and 7 with drive bar at forward end of stroke.
Figure 31:
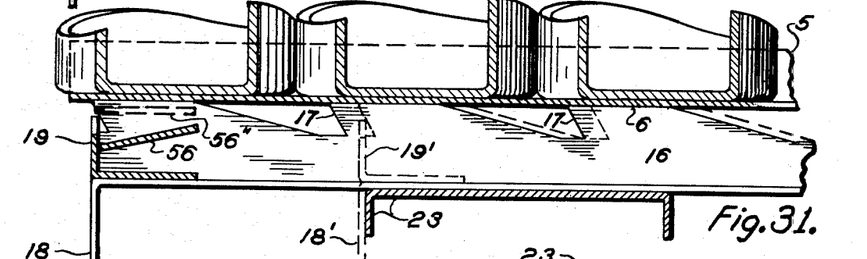
Figure 31 is a vertical section through a latch lug taken on the line 31—31 of Figures 6 and 7 with drive bar at rear end of stroke.
Figure 32:
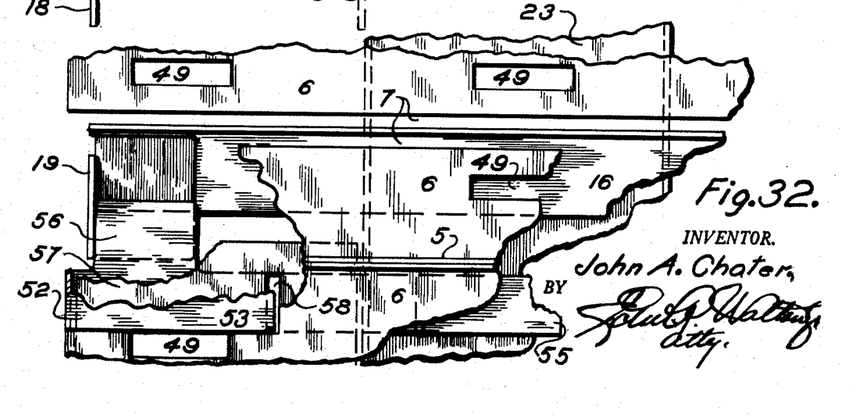
Figure 32 is a broken away top view of a portion of the discharge end of the unit showing relative position of a latch and a progressor bar.

Fig. 29 shows a latch 52 in section in a raised position since the bottles have all been vended from its row. The dotted line shows a latch in depressed position under the bottles in the next row. Fig. 30 is a section through the latch lug 56. When depressed as in the dotted position 56' it is in a position to strike the lug 19 of the progressor bar if the progressor bar moves rearward. It must be borne in mind that the bottle contacting portion 53 of the latch 52 is in a lane preceding the lane in which the progressor bar it controls is located. Preceding lane as used above means a lane nearer the front of the cabinet, that is a lane from which the bottles will be vended first. The cut away top view (Fig. 32) will help to make this clear, also the front view (Fig. 7), and perspective view (Fig. 39). Figure 30 shows the drive bar 23 at the extreme forward, or normal end of its stroke. Figure 31 shows the drive bar at the extreme rearward end of its stroke and with the latch 52 depressed as by a bottle. The progressor bar 16 has been drawn back by its spring 21 only a very short distance because it has been prevented from further rearward movement by the lug 56 of the latch 52 bearing against the lug 19 of the progressor bar 16. If the bottle is removed the end 53 of latch 52 will raise, (i. e., at its forward end), placing its lug 56 in the dotted position 56'' (Fig. 31), which is the same as the solid position of Fig. 30. In this case the progressor bar 16, due to the action of its spring 21, follows the drive bar 23 during its entire rearward stroke, the lug 18 bearing against the forward edge of the drive bar 23. The forward end of the progressor bar 16 is shown by dotted lines (Fig. 31), after it has followed the drive bar 23 as above to the rear end of the stroke, the lugs 18 and 19 being shown as 18' and 19' shown in dotted lines. The top of the lug 19' has passed under the raised lug 56''.

When the vending unit is full of bottles, only the progressor bar 16 at the front of the cabinet is free to follow the drive bar 23. This is because in each lane except the last lane the bottle nearest the discharge end is standing on a latch 52 and holding it down. Since all the latches 52 are depressed, all the progressor bars 16 except the first (which is not controlled by a latch 52) are prevented from moving to the rear with the drive bar 23. Therefore only the first progressor bar will be reciprocated by the drive bar until the first lane has had all its bottles discharged.

Figures 17, 18:
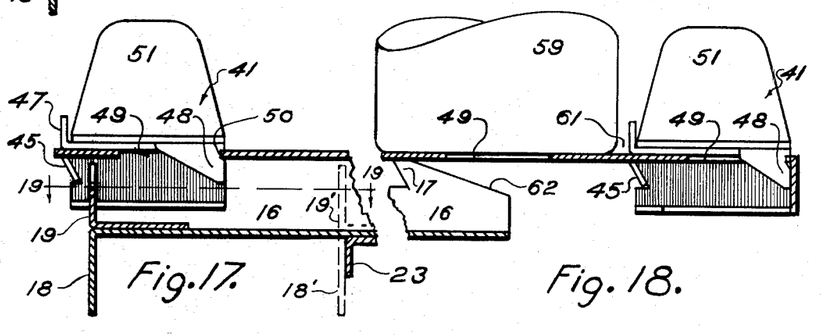
Figures 17 and 18 are enlarged sections through perforations in tray-slat at one side of a pusher on line 17—17, 18—18 of Figures 6 and 7 showing progressor bar latched by pusher and rear end of progressor bar in normal starting position.

Before a progressor bar 16 moves, its rear end is in the position shown in Fig. 18 ahead of the pusher 41. The pusher 41 rests flat on the tray slats because its lugs 48 project through the holes 49 which are punched through the slats 6. These poles 49 are punched in the slats 6 on both sides of the slots 7. They are located at the starting end and at intervals along the slots. The longitudinal pitch between the rear ends of these holes 49 is approximately equal to the width of the articles or diameter of the bottle to be vended. The bottle 59 (Figs. 4 and 18) is placed against a stop 60. These stops are shown from above in Fig. 4. This insures a little clearance 61 (Fig. 18) between the forward end of the pusher 41 and the bottle allowing free action of the pusher when first engaging its progressor bar 16.

Figure 13:
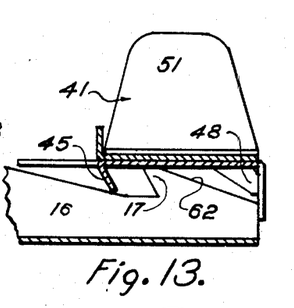
Figure 14:
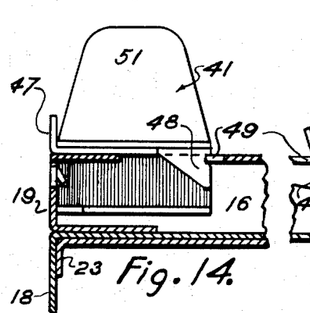
Figures 14, 15 and 16 are enlarged sections through perforations in tray-slat at one side of a pusher on line 14—14, 15—15 and 16—16 of Figures 6 and 7 showing pusher in various positions.
Figure 16:
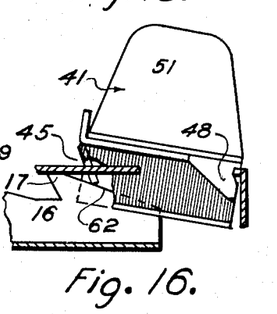

With the unit full of bottles, the first rearward movement of the drive bar 23 will allow the first progressor bar 16 to also move with it as previously described. As the first progressor bar 16 moves rearward the sloping end surface 62 enters the groove 43 in the pusher 41 and forces the drive lug 45 to slide up over it raising the forward end of the pusher 41 as shown in Fig. 16. As the progressor bar 16 moves back further, the lug 45 of the pusher 41 drops down forward of the first tooth of the progressor bar to the position shown in Fig. 13. The pusher 41 now again rests flat on the slats 6 of the tray. Figure 13 shows the progressor bar 16 at the extreme rear end of its travel. It will be noticed that the first tooth of the progressor bar 16 has moved back a little farther than is required to allow the lug 45 to drop forward of it. This is because a little over-travel is provided to be certain of proper action.

Figure 12:
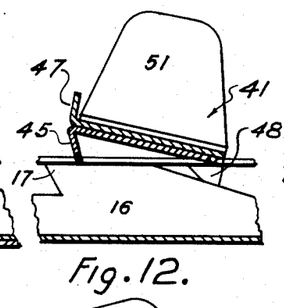
Figure 15:
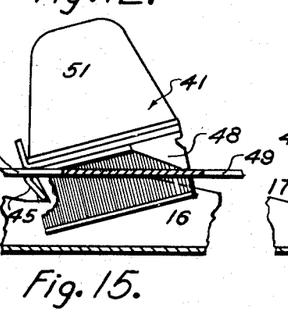

As the progressor bar 16 moves forward, as it is pushed by the drive bar 23 bearing against its lug 18, the first tooth of the progressor bar engages against the lug 45 of the pusher 41 and pulls it forward and in doing so moves the row of bottles in front of it. As the pusher is drawn forward the sloping lugs 48 slide up over the edge of the perforations 49 in the tray slats raising the rear end of the pusher, similar to the position shown in Fig. 15. When the end of the forward stroke is reached the lugs 48 drop into the next pair of perforations in the tray slats 6. Here again a little over-travel is provided to be sure of proper engagement of the lugs 48. As the forward stroke is completed the bottle at the discharge end of the lane is pushed off the end of the tray and slides down the chute 4 from where it is removed by raising the door 3. Since the length of the stroke is just a little longer than the diameter of one bottle and the leading bottle of each row before being moved is positioned with its forward side at the discharge end of a lane, one bottle is discharged on each forward stroke. In a similar way a second bottle is discharged from the front row but this time the second tooth of the progressor bar 16 engages the pusher lug 45. Fig. 12 shows a pusher 41 at an intermediate position on a rearward stroke of its progressor bar. Succeeding strokes discharge the rest of the first row. As a bottle which is discharged falls down the chute 4 it swings aside the plate 63 (Figs. 2 and 3) which is pivoted to the chute at its upper end and held in a slanting position across the chute by a spring 64. This slows up the fall of the bottle and also prevents any person from reaching up the chute and removing bottles. A small electrical switch, not shown, is opened as the plate 63 swings to allow the bottle to pass and in doing so opens the circuit of the solenoid 35 so that the next bottle cannot be discharged until another coin is inserted in slot 2, which will again energize the solenoid and allows the drive bar 23 to be operated by lever 1.

When the last bottle of the first row has been discharged, the latch 52 of the first row is released and swings up at its forward end. Therefore the second progressor bar now no longer restrained by the latch lug 56 bearing against the progressor bar's lug 19 will be drawn back by its spring 21 and follow the drive bar 23 on the next rearward stroke. In this way the discharge from the second row is started. In like manner discharge from all the other rows are started in succession. Thus the entire tray full of bottles will be discharged, one bottle being discharged every time the lever 1 is raised and lowered, provided a coin has been inserted before each operation of the lever.

Figure 19:
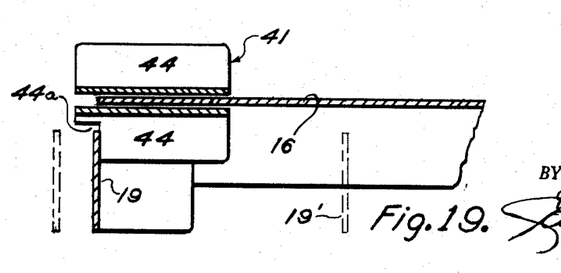
Figure 19 is a section on line 19—19 of Figure 17 looking downward.

An added feature of the invention is that after a row has been discharged, the progressor bar 16 for that row is locked in inoperative position at the end of its forward stroke. This is done by the pusher 41 when it pushes off the last bottle of its row. One corner of the lower flange 44 of the pushers 41 are cut back, as previously mentioned, at the forward end as at 44a (Figs. 19 and 25). This allows enough clearance for this flange to drop down in the rear of or move behind the upwardly pointing lug 19 at the forward end of the progressor bar 16. In doing so it blocks the rearward stroke of the progressor bar 16 and holds it at the forward end of its stroke since the pusher 41 cannot move to the rear because its lugs 48 have engaged the last pair of perforations in the slats 6 and there are no other sloping or camming surfaces 62 on the progressor bar to engage the drive lug 45 on the pusher. This feature of preventing further strokes of a progressor bar after it has caused the discharge of all the bottles in its row is not essential to the operation of the unit but is of great practical advantage because it relieves the drive bar 23 from the necessity of moving more than one progressor bar 16 at a time against spring action on the forward strokes. It also saves wear of the parts. The progressor bar springs 21 are light because they only have to move the progressor bars 16 alone but a considerable resistance would be added if they were all stretched at once. Therefore the effort at the operating lever 1 is kept to a minimum, since a lighter spring 39 can be used to turn the shaft 25 and this spring resists the upward movement of the operating lever.

It will be noted that there is a space 64 provided in the cabinet just below the vending unit. This space is for storing bottles for precooling before they are placed in the vending unit. The larger space 65 is for installation of a refrigeration unit not shown.

A variation in the mechanism is shown. This variation is in the construction and operation of the latches which control the progressor bars. The general operation of the unit, however, is the same, as previously described.

This alternate construction is desirable for certain applications as, for example, in handling very light weight articles or articles the bottom of which is of such shape that it will not properly contact the latches previously described.

In the preceding description, it is stated that each latch is held in position to prevent a rearward stroke of the progressor bar by the presence of an article resting on the latch and depressing it. When the last article of its row is pushed off the latch, by the forward motion of the pusher, the latch raises and releases the progressor bar of the next row.

In the variation, now to be described, each latch is normally in depressed preventing position and is forced to swing upward to releasing position directly by the pusher 41, which contacts it during its forward motion while discharging the last article from the row. Thus the latch is controlled directly by the pusher instead of indirectly—by the pushing of an article off the latch.

Figures 40, 41, 42, 43, 44, 45A, 45B, 45C, 46A, 46B, 46C:
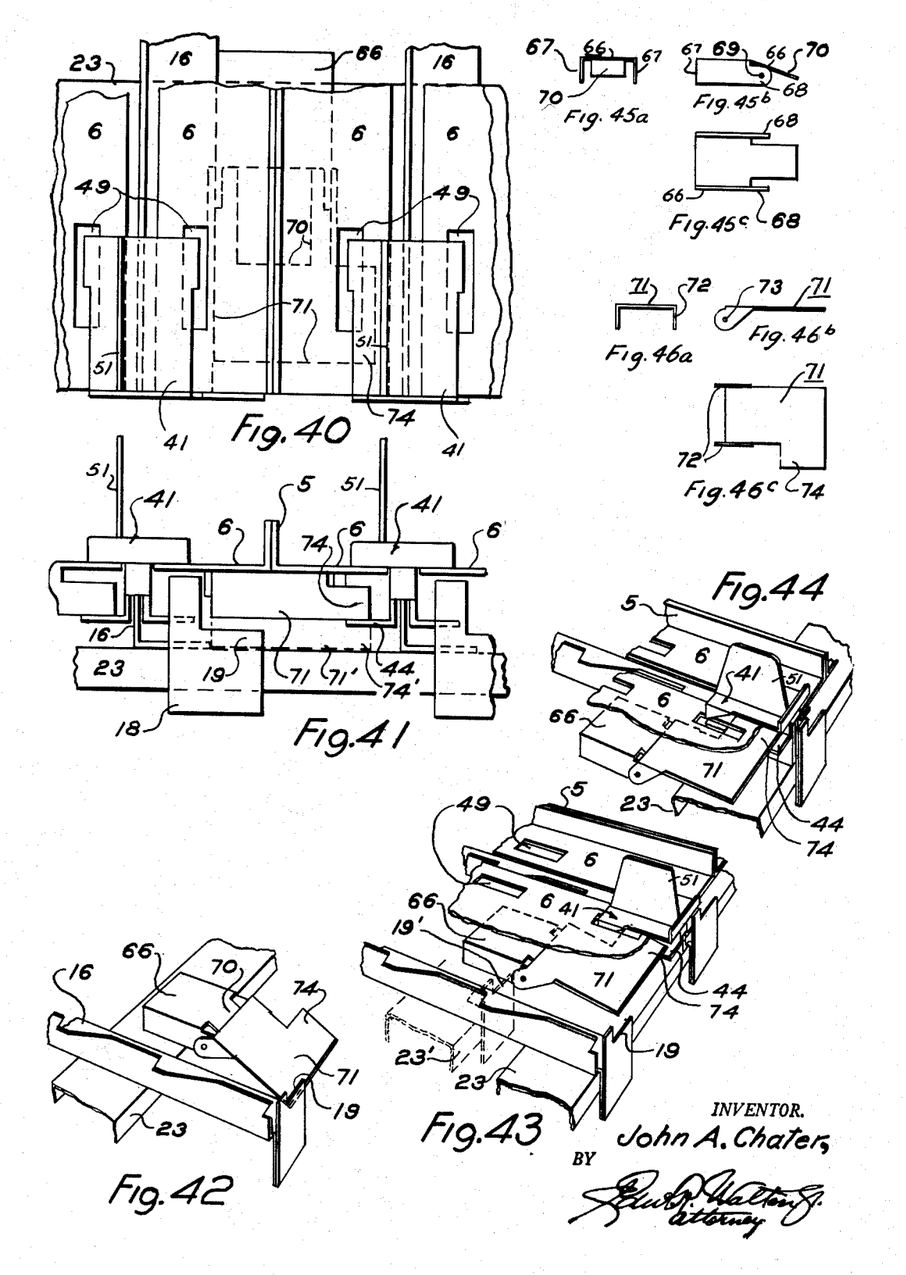
Figure 40 is a partial top view of the discharge end of the vending unit showing latch variation.
Figure 41 is a front view of Figure 40.
Figure 42 is a perspective view showing the variation latch in preventing position, the tray slats removed.
Figure 43 is a perspective view showing variation latch held in releasing position by its pusher.
Figure 44 is a perspective view showing variation latch raised by pusher which is being reset to starting position.
Figures 45a, 45b and 45c are rear end, side and bottom views of a latch bracket.
Figures 46a, 46b and 46c are end, side and bottom views of one variation latch.

A latch bracket 66 is shown in Figs. 45a–b and c. This is made from sheet metal suitably cut so that the sides 67 can be bent downward. The forward ends of these sides form lugs 68 and have pivot holes 69 punched in them. The top has a forwardly projecting portion 70 which is bent downward at a predetermined angle.

A latch 71 is shown in Figs. 46a–b and c. This is also made of sheet metal suitably cut and bent. Lugs 72 are bent down on each side at the rear end. They also project somewhat to the rear and are pierced with pivot holes 73. One side of the forward end of the piece projects to one side forming the pusher contacting lug 74 shown in the bottom view 46c.

The latch 71 is placed over the projection 70 of the bracket 66 and the holes 73 of the latch are aligned with holes 69 of the bracket and a suitable pivot is assembled through the holes. The lugs 72 fit closely outside the lugs 68. The latch is therefore pivotally connected to the bracket and can swing about the horizontal pivot but is supported at the bottom of its swing by the projection 70.

A bracket with its latch attached is assembled, by spot welding, to the lower side of the tray slats 6 with the latch projecting forward. Figure 40 shows the bracket and latch below the slats 6 mostly by dotted lines. One of these assemblies is attached between each pair of adjacent rows.

Normally the latch rests on the projection 70, the forward end of the latch falling down behind the lug 19 and preventing the progressor 16 which it controls from following the drive bar 23 on its rearward stroke as is clearly shown in Fig. 42 in which the drive bar 23 is shown at the rear end of its stroke. In this variation the lug 19 is formed and attached slightly differently than previously shown. Figure 41 shows the latch in preventing position in dotted lines at 71' and held in non-preventing position 71, by solid lines, by the adjacent lower flange 44 of the pusher 41 that controls it. When held in raised position the end of the latch is above the top of the portion of lug 19 which it normally contacts, so that lug 19 can pass under it as it and its progressor bar 16 follow the drive bar 23 on a rearward stroke.

This is shown in Fig. 43. As the pusher 41 was moved forward, in discharging the last article from its row, one of its lower flanges 44 contacted the lug 74 which is positioned to slope downward forwardly in its path. The flange 44 therefore raises the lug 74 by sliding under it and comes to the position shown in Fig. 43. This raises the forward end of the latch above the top of the lug 19. The drive bar 23 and the lug 19 of the progressor bar which has followed it is shown in dotted lines and are indicated by primed figures 23' and 19' in Fig. 43.

The above describes the essential operation of the latches 71 for controlling the progressor bars 16. However, it is necessary to be able to reset the pushers 41 to starting position. Figure 44 shows a pusher raised as high as possible so as to clear the teeth of its progressor bar 16 to allow resetting to its starting position. It will be seen that this is made possible because, as shown in this figure, the latch 71 will swing upward until it is flat against the under side of the slats 6 with the flange 44 of the pusher 41 below it. This allows the pusher 41 to be raised high enough to clear the progressor bar teeth and to be moved back along its slot 7 to its starting position. When the pusher 41 is moved away the latch 71 falls back to its normal preventing position shown in Fig. 42 and the lug 19 will be ahead of it since the drive bar is always at the forward end of its stroke when the pushers 41 are reset.

The complete vending unit operates as follows:

The lever 1 is in its lowest or normal position.

The cabinet door is opened and the pushers 41 are grasped by their handles 51 and lifted until their flanges 44 bear against the under sides of the slats 6. Thus held they are moved to their starting positions at the end of the tray farthest from the discharge. When raised their lugs 45 will clear the teeth of the progressor bars 16.

The several lanes of the vending unit are then filled with bottles placed in rows in standing position.

Having placed all the pushers 41 in their starting positions and filled the unit with bottles the cabinet door is closed.

To vend a bottle, a coin is inserted into the slot 2 from which it drops into a suitable coin mechanism not shown. This closes an electric circuit and allows current to energize the solenoid 35, and places lever 1 in operating connection.

Lever 1 is then raised to the top of its swing and is allowed to return to the lower or normal position.

The door 3 is then opened and the discharged bottle removed.

A bottle is delivered each time a coin is inserted and lever operated.

The above description covers the preferred design and construction but many variations can be made without departing from the fundamental principle of the invention.

Having thus fully described the invention and its manner of operation it is to be understood that many changes and modifications may be made therein without departing from the spirit of the invention or the scope of the appended claims.

That which is claimed as new is:

1. In a device for the controlled discharge of articles, a retaining support for the articles to be discharged, a plurality of lanes each having a discharge end and in each of which lanes said articles are adapted to be placed in file and retained until discharged, actuating means for each lane for progressively advancing said articles along said lanes to successively discharge them therefrom, a common actuator having an operable connection with said actuating means, operable latch means for each of said lanes except the starting lane and positioned to render said actuating means effective and ineffective to advance and discharge the articles therefrom, each of said latch means being biased to a position to render said actuating means effective, each of said latch means having a control part positioned in the path of the articles at the discharge end of another of said lanes—including said starting lane and excluding the last lane—to be operated by the articles therein to position its latch means to render the actuating means for its lane ineffective until the articles in the lane containing its control part have been discharged therefrom, whereby, when all the articles in one lane have been discharged therefrom, the control part therein is released by said articles to allow a latch means in another lane to render its actuating means automatically effective to advance and discharge articles therefrom upon operation of said common actuator.

2. In a device for the controlled discharge of articles, a retaining support for the articles to be discharged, a plurality of lanes each having a discharge end and in each of which lanes said articles are adapted to be placed in file and retained until discharged, actuating means for each lane for progressively advancing said articles along said lanes to successively discharge them therefrom, a common actuator having an operable connection with said actuating means, operable latch means for each of said lanes except the starting lane and positioned to render said actuating means effective and ineffective to advance and discharge the articles therefrom, each of said latch means being biased to a position to render said actuating means ineffective, each of said latch means having a control part positioned in the path of a portion of the actuating means for progressing articles in another of said lanes—including said starting lane and excluding the last lane—to be operated by said portion of the actuating means in said other lane to a position to render the actuating means for its lane effective when the actuating means for said other lane discharges the last article from said other lane, whereby when the last article in one lane is discharged therefrom, the control part therein is operated by the actuating means in that lane, by the actuation which causes said last discharge, to position a latch means in another lane to render its actuating means automatically effective to advance and discharge articles therefrom upon operation of said common actuator.

3. In a device for the controlled discharge of articles from a plurality of rows of such articles sequentially and successively from each row, an article supporting member presenting surfaces upon which the articles to be discharged are placed in rows, guides arranged to confine said rows of articles in lanes, article advancing means associated with each lane and mounted on said supporting member to be moved to an initial starting position and for movement from said starting position to advance its row of articles in its lane and discharge a predetermined number of articles therefrom, a common operating means for actuating all of said advancing means intermittently in their discharging movement, a latch means for each lane, except the first lane to be discharged, including a latch member movably mounted to latching and unlatching positions and positioned to prevent the actuation of its advancing means to discharge articles therefrom when in latching position, each of said latch means further having a tripping member positioned for operation from the movement of the advancing means of another lane, except the last lane to be discharged, and operatively connected to its latch member to move it to unlatching position when the advancing means of said other lane is operated to cause the last article to be discharged from said other lane, each latch means being automatically set in latching position when the advancing means of said other lane is positioned to effect the discharge of articles therefrom and when articles are replaced in said lane.

4. In a device for the controlled discharge of articles as set forth in claim 3 wherein there are means for locking the advancing means of each lane to the supporting member to prevent its further operation by said common operating means, when it has discharged all articles from its lane, and controlled means for actuating said common operating means.

5. In a device for the controlled discharge of articles, an article supporting member presenting surfaces upon which the articles to be discharged are placed, substantially straight parallel guides arranged to confine said articles in lanes each having a discharge end, a drive bar extending transversely to the lanes and mounted to the supporting means for sidewise reciprocation, means for reciprocating said drive bar, article advancing means associated with each lane and adapted to be placed in an initial article advancing position and disposed therein to be actuated by said drive bar to discharge a predetermined number of articles from the discharge ends of the lanes upon each complete to and fro movement of said drive bar, a latch means for each lane, except the first lane to be discharged, including a latch member movably mounted to latching and unlatching positions and positioned to prevent the actuation of the advancing means to discharge articles therefrom when in latching position, each of said latch means further having a tripping member positioned for operation from the movement of the advancing means of another lane, except the last lane to be discharged, and operatively connected to its latch member to move it to unlatching position when the advancing means of said other lane is operated to cause the last article to be discharged from said other lane, each latch means being automatically set in latching position when the advancing means of said other lane is positioned to effect the discharge of articles therefrom and when articles are replaced in said other lane, whereby a predetermined number of articles may be discharged successively from one lane and, when depleted, from another lane upon each reciprocation of said drive bar.

6. In a device for the controlled discharge of articles, a supporting member in the form of a rectangular tray with a substantially horizontal flat surface, substantially parallel guides extending the length of said surface dividing it into straight parallel lanes in which the articles to be discharged are placed upon said surface in rows, a drive bar extending transversely to and under said lanes and mounted to said tray for sidewise reciprocation, a shaft extending transversely to said lanes and rotatably mounted to said tray, arms on each side of said tray extending at right angles and rigidly attached to said shaft, links on each side of said tray and pivotally connected to said arms and to each end of said drive-bar, means connected with said shaft to oscillate the same through an arc to reciprocate said drive bar, article advancing means associated with each lane and mounted and disposed therein to be placed in initial starting position and to be actuated by each reciprocation of said drive bar to discharge a predetermined number of articles from said lanes, a latch means for each lane, except the first lane to be discharged, including a latch member movably mounted to latching and unlatching positions and disposed to prevent the actuation of the advancing means to discharge articles therefrom when in latching position, each of said latches further having a tripping member positioned for operation from the movement of the advancing means of another lane, except the last lane to be discharged, and operatively connected to its latch member to move it to unlatching position when the advancing means of said other lane is operated to cause the last article to be discharged from said other lane, each latch means being automatically set in latching position when the advancing means of said other lane is positioned to effect the discharge of articles therefrom and when articles are replaced in said other lane, whereby a predetermined number of articles may be discharged successively from said lanes sequentially until depleted.

7. In a device for the controlled discharge of articles as set forth in claim 3 wherein there are means for locking the advancing means of each lane to the supporting member to prevent its further operation by said common operating means, when it has discharged all articles from its lane, and wherein the advancing means are automatically unlocked from the supporting member, when they are placed in starting position, and controlled means for actuating said common operating means.

8. In a device for the controlled discharge of articles, an article supporting member presenting surfaces upon which the articles to be discharged are placed in rows, guides to confine the rows in lanes, a pusher for initial placement at one end of each lane, a progressor bar extending parallel and adjacent to each lane and mounted to the supporting member for endwise reciprocation, the pusher and progressor bar of each lane being adapted to lock together on the forward stroke and release on the rearward stroke of the progressor bar, whereby the pushers will advance the articles along the lanes, the pushers being adapted to engage the surface to prevent rearward motion and to release to permit forward motion, means for reciprocating the progressor bars, means at the discharge end of each lane except the last to be discharged lane, for preventing the reciprocation of the progressor bar in the next to be discharged lane by the reciprocating means, the preventing means being placed in operative position by the presence of an article at the discharge end of its lane and in inoperative position when the article is removed, and actuatable means for operating the reciprocating means, the reciprocation at each actuation being just sufficient to discharge a predetermined number of articles from the surfaces, upon each actuation of said actuatable means.

9. In a device for the controlled discharge of articles, an article supporting member presenting surfaces upon which articles to be discharged are placed in rows, guides to confine the rows in lanes, a pusher for initial placement at one end of each lane, a progressor bar extending parallel and adjacent to each lane and mounted to the supporting member for endwise reciprocation, said progressor bars being normally biased to move to a rearward position, said pushers and progressor bars of each lane being adapted to lock together, when the progressor bar starts a forward stroke, and to disengage, when it starts a rearward stroke, and cooperative means between said pushers and said article supporting member arranged to lock said pushers in their positions relative to said supporting surface against rearward motion relative thereto but to allow forward motion thereof, means common to said progressor bars to move them forwardly against their bias to advance the articles in said lanes a predetermined number of times, latch means associated with each lane, except the last lane to be discharged, for preventing reciprocation of the progressor bar of the next to be discharged lane, said latch means being placed in unlatching position by the motion of the pusher when it causes the last discharge from its lane, and actuatable means to actuate the reciprocating means; whereby a predetermined number of articles are discharged for each actuation, said articles being first discharged from one row and then successively from succeeding rows.

10. A device as set forth in claim 9 further characterized by each of said latch means being positioned and biased to normally engage the progressor bar controlled by it to prevent said bar moving rearwardly and being positioned to be contacted by the pusher of the previously discharged lane and moved out of said engagement when said pusher's progressor bar is operated to cause the last discharge from its row.

11. A device as set forth in claim 9 further characterized by each latch means being pivoted on the supporting member and having a portion positioned and biased to normally contact a portion of the progressor bar of one lane to prevent a rearward stroke of said progressor bar and having a pusher contacting portion normally positioned in the path of the pusher of a previously to be discharged lane and adapted to be moved out of said path by the pusher of that lane when said pusher is operated to cause the last discharge from its lane, whereby the portion contacting the progressor bar is moved out of such contact to allow the progressor bar of the first mentioned lane to make a rearward stroke on the next operation of said means common to said progressor bars.

12. A device as set forth in claim 9 wherein each latch means is a lever fulcrumed at its rear end to the supporting members and having a portion at its forward end formed to normally contact an abuttal portion of a progressor bar of one lane to prevent the progressor bar from making a rearward stroke and further having a pusher contacting portion sloping forwardly downward in the path of a contacting portion of the pusher of a previously to be discharged lane, whereby, when said pusher is operated to cause the last discharge from its lane, its contacting portion slides under and raises the pusher contacting portion of the lever and thereby raises the progressor bar contacting portion to allow the contacted portion of the progressor bar to pass under it and follow the progressor bar moving means on subsequent rearward strokes of said last mentioned moving means.

13. In a device for the controlled discharge of articles, an article supporting member presenting surfaces upon which the articles to be discharge are placed in rows, guides to confine the rows in lanes, pushers for initial placement at one end of each lane, a progressor bar extending parallel and adjacent to each lane and mounted for endwise reciprocation to the supporting member, means for reciprocating the progressor bars, the pusher and progressor bar of each lane being adapted to lock together on a forward stroke and release on a rearward stroke of the progressor bar, means associated with each lane, except the last to be discharged lane, to prevent reciprocation of the progressor bar of the next to be discharged lane, by the reciprocating means, said preventing means being placed in inoperative position by the motion of the pusher when it makes the last discharge from the lane, and actuatable means for operating the reciprocating means, the reciprocation being just sufficient to discharge a predetermined number of articles upon each actuation of said actuatable means.

14. A device as set forth in claim 13 further characterized by each of said preventing means being positioned and biased to normally engage the progressor bar controlled by it to prevent said bar moving rearwardly and being positioned to be contacted by the pusher of the previously discharged lane and moved out of said engagement when said pusher's progressor bar is operated to cause the last discharge from its row.

15. A device as set forth in claim 13 further characterized by each said preventing means being pivoted to the supporting member and having a portion positioned to normally contact a portion of the progressor bar of one lane to prevent a rearward stroke of said progressor bar and having a pusher contacting portion normally positioned in the path of the pusher of a previously to be discharged lane and adapted to be moved out of said path by the pusher of that lane when said pusher is operated to cause the last discharge from its lane, whereby the portion contacting the progressor bar is moved out of such contact to allow the progressor bar of the first mentioned lane to make a rearward stroke on the next operation of the reciprocating means.

16. A device as set forth in claim 13 wherein each said preventing means is a lever fulcrumed at its rear end to the supporting member and having a portion at its forward end formed to normally contact an abuttal portion of a progressor bar of one lane to prevent the progressor bar from making a rearward stroke and further having a pusher contacting portion sloping forwardly downward in the path of a contacting portion of the pusher of a previously to be discharged lane, whereby when said pusher is operated to cause the last discharge from its lane, its contacting portion slides under and raises the pusher contacting portion of the lever and thereby raises the progressor bar contacting portion to allow the contacted portion of the progressor bar to pass under it and follow the reciprocating means on subsequent rearward strokes of the reciprocating means.

17. In a device for the controlled discharge of articles, an article supporting member presenting surfaces upon which the articles to be discharged are placed in parallel rows, there being a discharge end and a starting end, parallel guides confining the articles in lanes extending from the starting to the discharge end, there being a first lane from which articles are first discharged and succeeding lanes from which articles are discharged, progressively, one lane at a time, in the order of their succession, and a last lane from which articles are last discharged; a pusher, to move the articles, and a progressor bar associated with each lane and a latch associated with each lane except the last lane; a drive bar extending transversely to the lanes and mounted to the supporting member for sidewise reciprocation; actuatable means for reciprocating the drive bar; each progressor bar extending parallel to the lanes and mounted to the supporting member for endwise reciprocation and with a spring connected to each progressor bar and to the supporting member tending to force its progressor bar toward the starting end, the progressor bar having a portion for bearing against the forward, or side toward the discharge, of the drive bar to oppose the action of the spring and enable the drive bar to force the progressor bars toward the discharge end on a forward stroke; each pusher being adapted to be initially placed at the starting end and to slide along its lane and push the row of articles, the pusher and progressor bar of each lane being adapted to lock together on a forward stroke and release on a rearward stroke of the progressor bar, the pusher and supporting member being adapted to lock together to prevent the pusher making a rearward stroke and to release to permit it to make a forward stroke with the progressor bar; each latch being placed by the presence of an article at the discharge end of its lane, in operative position to prevent, by opposing the action of the spring, the progressor bar of the next succeeding lane from following the drive bar on a rearward stroke, and released to inoperative position when the article is removed whereby a predetermined number of articles are pushed off the discharge end for each rearward and forward stroke of the drive bar.

18. A device as set forth in claim 17 wherein the latch means is formed of resilient material with a portion for contacting the progressor bar of the next to be discharged lane and having an article contacting end formed by bending the material upward, rearward and downward, the end of the downwardly bent portion being close to the body of the latch and adapted to be sprung away from the latch and slipped over the discharge edge of the surface and inserted through a perforation in the supporting member to keep the latch in place and allow quick removal and a counterweight at the other end of the latch, the latch swinging as a lever on the surface at the forward edge of the perforation.

19. In a device for the controlled discharge of articles, an article supporting member presenting surfaces upon which the articles to be discharged are placed in parallel rows, there being a discharge end and a starting end, parallel guides confining the articles in lanes extending from the starting to the discharge end, there being a first lane from which articles are first discharged and succeeding lanes from which articles are discharged, progressively, one lane at a time, in the order of their succession, and a last lane from which articles are last discharged; a pusher, to move the articles, and a progressor bar associated with each lane and a latch associated with each lane except the last lane; a drive bar extending transversely to the lanes and mounted to the supporting member for sidewise reciprocation; means for reciprocating the drive bar; each progressor bar extending parallel to the lanes and mounted to the supporting member for endwise reciprocation and with a spring connected to each progressor bar and to the supporting member tending to force its progressor bar toward the starting end, the progressor bar having a portion for bearing against the forward, or side toward the discharge, of the drive bar to oppose the action of the spring and enable the drive bar to force the progressor bars toward the discharge end on a forward stroke; each pusher being adapted to be initially placed at the starting end and to slide along its lane and push the row of articles, the pusher and progressor bar of each lane being adapted to lock together on a forward stroke and release on a rearward stroke of the progressor bar, the pusher and supporting member being adapted to lock together to prevent the pusher making a rearward stroke and to release to permit it to make a forward stroke with the progressor bar; each latch preventing, by opposing the action of the spring, the progressor bar of the next succeeding lane from following the drive bar on a rearward stroke until placed in inoperative position by the movement of the pusher of its lane when causing the last discharge from its lane whereby a predetermined number of articles are pushed off the discharge end for each rearward and forward stroke of the drive bar.

20. In a device for the controlled discharge of articles, an article supporting member presenting surfaces upon which the articles to be discharged are placed in parallel rows, there being a discharge end and a starting end, parallel guides confining the articles in lanes extending from the starting to the discharge end, there being a first lane from which articles are first discharged and succeeding lanes from which articles are discharged, progressively, one lane at a time, in the order of their succession, and a last lane from which articles are last discharged; a pusher, to move the articles, and a progressor bar associated with each lane and a latch associated with each lane except the last lane; a drive bar extending transversely to the lanes and mounted to the supporting member for sidewise reciprocation; means for reciprocating the drive bar; each progressor bar extending parallel to the lanes and mounted to the supporting member for endwise reciprocation and with a spring connected to each progressor bar and to the supporting member tending to force its progressor bar toward the starting end, the progressor bar having a portion for bearing against the forward, or side toward the discharge, of the drive bar to oppose the action of the spring and enable the drive bar to force the progressor bars toward the discharge end on a forward stroke; each pusher being adapted to be initially placed at the starting end and to slide along its lane and push the row of articles, the pusher and progressor bar of each lane being adapted to lock together on a forward stroke and release on a rearward stroke of the progressor bar, the pusher and supporting member being adapted to lock together to prevent the pusher making a rearward stroke and to release to permit it to make a forward stroke with the progressor bar; each latch including a portion normally projecting into the path of the articles in its lane and being in inoperative position, when no article is present at the discharge end of the lane but being held in operative position by the presence of an article exerting pressure to hold the latch out of its path, the latch having a portion projecting into the rearward path of a portion of the progressor bar of the next succeeding lane to prevent the progressor bar, by opposing the action of its spring, from following the rearward strokes of the drive bar, when the latch is in operative position and moving to clear the progressor bar when the latch moves to inoperative position whereby a predetermined number of articles are pushed off the discharge end for each rearward and forward stroke of the drive bar.

21. In a device for the controlled discharge of articles, an article supporting member presenting surfaces upon which the articles to be discharged are placed in parallel rows, there being a discharge end and a starting end, parallel guides confining the articles in lanes extending from the starting to the discharge end, there being a first lane from which articles are first discharged and succeeding lanes from which articles are discharged, progressively, one lane at a time, in the order of their succession, and a last lane from which articles are last discharged; a pusher, to move the articles, and a progressor bar associated with each lane and a latch associated with each lane except the last lane; a drive bar extending transversely to the lanes and mounted to the supporting member for sidewise reciprocation; means for reciprocating the drive bar; each progressor bar extending parallel to the lanes and mounted to the supporting member for endwise reciprocation and with a spring connected to each progressor bar and to the supporting member tending to force its progressor bar toward the starting end, the progressor bar having a portion for bearing against the forward, or side toward the discharge, of the drive bar to oppose the action of the spring and enable the drive bar to force the progressor bars toward the discharge end on a forward stroke; each pusher being adapted to be initially placed at the starting end and to slide along its lane and push the row of articles, the pusher and progressor bar of each lane being adapted to lock together on a forward stroke and release on a rearward stroke of the progressor bar, the pusher and supporting member being adapted to lock together to prevent the pusher making a rearward stroke and to release to permit it to make a forward stroke with the progressor bar; each latch consisting of a lever mounted on the supporting member at the discharge end of its lane, to swing about a horizontal axis, there being an article contacting end which normally swings above the article supporting surface by reason of an overbalance of the other end and adapted to swing downward to the level of the supporting surface and be so held by an article when the article rests above it on the supporting surface, the lever having a portion which projects, when the article contacting end is depressed, into the rearward path of a portion of the progressor bar of the next succeeding lane and preventing it, by opposing the action of its spring, from following the drive bar on a rearward stroke and clearing the progressor bar when the article contacting end of the lever is allowed to rise by removal of the article, whereby a predetermined number of articles are pushed off the discharge end for each rearward and forward stroke of the drive bar.

22. In a device for the controlled discharge of articles, an article supporting member presenting surfaces upon which articles to be discharged are placed in rows, guides to confine the rows in lanes, a pusher for initial placement at one end of each lane, and a progressor bar extending parallel and adjacent to each lane and mounted to the supporting member for endwise reciprocation, the pushers and progressor bars of each lane being adapted to lock together, when the progressor bar starts a forward stroke, and to disengage, when it starts a rearward stroke, and cooperative means adapted to lock said pushers in their positions relative to said article supporting surface against rearward motion relative thereto and to prevent its progressor bar from again being reciprocated, by locking against a portion of the progressor bar to prevent a rearward stroke of the progressor bar, when the pusher has reached the discharge end of its lane, said cooperative locking means being adapted to release said pushers upon forward motion of their progressor bars in advancing said pushers, means for successively reciprocating one of said progressor bars at a time and a predetermined number of times, latch means associated with each lane, except the last to be discharged lane, for preventing reciprocation of the progressor bar of the next to be discharged lane by the reciprocating means, said latch means being placed in inoperative position by the motion of the pusher when it causes the last discharge from the lane, and actuatable means to actuate the reciprocating means, whereby upon each actuation a predetermined number of articles are discharged from one row and then successively from succeeding rows.

23. In a device for the controlled discharge of articles, an article supporting member in the form of a rectangular tray presenting a substantially horizontal flat surface; parallel guides extending the length of the surface spaced slightly further apart than the width of the articles, forming lanes in which the articles are placed in rows, a slot in the surface of the tray between the guides of each lane extending the length of the lane, the slot being closed at one end of the surface, called the starting end, and open through the edge of the surface at the other end called the discharge end; a clear space wider than the slot under and extending the length of the slot; a pusher adapted to be moved along in each slot and to be inserted in its slot from the discharge end and having a portion above the slot wider than the slot to rest on the surface and a portion below the slot wider than the slot to prevent its upward removal from the slot, a progressor bar extending lengthwise of and below the slot mounted in guides on the tray for endwise reciprocation, each progressor bar being inserted into its guides from the discharge end; a drive bar extending transversely of the lanes, under the tray, and supported at its ends by guides on the tray for limited sidewise reciprocation; means to reciprocate the drive bar; a lug on each progressor bar for bearing against the drive bar on the forward side toward the discharge end; a spring for each progressor bar connected to the tray and hooked onto its progressor bar, for quick removal, forcing the progressor bar lug against the drive bar unless prevented; the progressor bar and pusher of each lane being adapted to lock together on a forward and release on a rearward stroke of the progressor bar and the pushers and tray being adapted to lock together to prevent the pushers from making a rearward stroke and to permit them to advance with their progressor bars on a forward stroke, a second lug on the discharge end of each progressor bar projecting into the path of the pusher of its lane to prevent the pusher falling out of the discharge end of its slot; a latch at the discharge end of each lane except the last to be discharged lane, for preventing the progressor bar of the next to be discharged lane, from following the drive bar on a rearward stroke by resisting the force of the spring, the latch being placed in inoperative position by the forward movement of the pusher of the lane, with which it is associated, when the pusher causes the last discharge from its lane; whereby a predetermined number of articles are discharged from the surface for each rearward and forward stroke of the drive bar, the articles being dischaged first from one lane and then in succession from the other lanes in turn, one lane at a time, and the progressor bars and the pushers being readily removable for cleaning and servicing by removing them from the discharge end after disconnecting the springs.

24. In a device for the controlled discharge of articles, an article supporting member in the form of a rectangular tray, presenting a substantially horizontal flat surface, divided into straight parallel lanes by guides, spaced slightly further apart than the width of the articles, extending the length of the surface; a slot in the surface of each lane extending the length of the lane; a clear space below and wider than the slot extending the length of the slots; a pusher adapted to be moved along in each slot having a portion wider than the slot to rest on the surface and a portion below the slot wider than the slot to prevent upward removal from the slot but permit limited upward movement, lugs on the pushers for engaging depressions in the surface to prevent rearward movement of the pusher, the forward sides of the lugs or the depressions being sloped upwardly forward to slide the lugs out of the depressions by raising the rear end of the pusher and a downwardly projecting lug at the forward end of each pusher to engage a progressor bar; a progressor bar mounted to the tray, below and extending lengthwise of each slot, for endwise reciprocation, its upper edge being just below the slot and having teeth cut in it, the teeth being formed on their forward ends to engage the pusher drive lug and sloped downwardly to the rear on the back to slide under the lug by raising the forward end of the pusher, it being possible to manually raise the pusher sufficiently to clear the teeth of the progressor bar and place it in its starting position at the rearward end of its slot, the progressor bar having a downwardly pointing lug for bearing against the forward side of a drive bar and an upwardly pointing lug at its forward end for engaging a latch and the pusher, the pusher being adapted to engage this lug when it reaches the discharge end of its lane to hold the progressor bar near the forward end of its travel; a drive bar extending transversely of the lanes under and mounted to the tray for sidewise reciprocation; means for reciprocating the drive bar, a spring connected to each progressor bar and to the tray exerting a force on the progressor bar toward the starting end, a latch consisting of a lever mounted at the discharge end of each lane, except one side lane, to the tray on a horizontal fulcrum and having an article contacting end to normally swing to a position above the surface of the tray by an overbalance of the other end and arranged to swing downward below the surface and be so held when an article rests on the tray above it, a portion of the lever swinging downwardly into the rearward path of the upwardly projecting lug on the progressor bar of the adjacent lane, toward the side without a latch, to hold the progressor bar of the adjacent lane near the forward end of its travel; whereby a predetermined number of articles are pushed off the discharge end of the tray for each rearward and forward stroke of the drive bar until all the articles are discharged and each progressor bar is restrained from further action after its lane is empty of articles in order that the spring of only one progressor bar will oppose the forward strokes of the drive bar at one time.

References Cited in the file of this patent

UNITED STATES PATENTS

| | | |
|---|---|---|
| 1,708,407 | Arnold | Apr. 9, 1929 |
| 2,581,216 | Tandler et al. | Jan. 1, 1952 |